US011489892B2

(12) United States Patent
Leland et al.

(10) Patent No.: US 11,489,892 B2
(45) Date of Patent: Nov. 1, 2022

(54) SYSTEMS AND METHODS FOR DISTRIBUTION OF SHARED CONTENT BASED ON SESSION CONTEXT

(71) Applicant: Dell Products, L.P., Round Rock, TX (US)

(72) Inventors: Jake Mitchell Leland, Round Rock, TX (US); Tyler Ryan Cox, Austin, TX (US); Spencer G. Bull, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/088,188

(22) Filed: Nov. 3, 2020

(65) Prior Publication Data

US 2022/0141265 A1    May 5, 2022

(51) Int. Cl.
  *H04L 65/403* (2022.01)
  *G06F 3/16* (2006.01)
  *H04W 4/80* (2018.01)
  *H04L 65/401* (2022.01)

(52) U.S. Cl.
  CPC ............ *H04L 65/403* (2013.01); *G06F 3/165* (2013.01); *H04L 65/4015* (2013.01); *H04W 4/80* (2018.02)

(58) Field of Classification Search
  None
  See application file for complete search history.

(56) References Cited

U.S. PATENT DOCUMENTS

| | | | | |
|---|---|---|---|---|
| 2004/0165768 | A1* | 8/2004 | Zhang | H04L 65/4046 348/E7.083 |
| 2012/0231441 | A1* | 9/2012 | Parthasarathy | G09B 7/02 434/362 |
| 2013/0057640 | A1* | 3/2013 | Callahan | G06Q 30/02 348/14.02 |
| 2013/0073965 | A1* | 3/2013 | Sik | G06F 3/1462 715/730 |
| 2013/0091205 | A1* | 4/2013 | Kotler | H04L 65/403 709/204 |
| 2014/0109210 | A1* | 4/2014 | Borzycki | G06F 21/32 726/7 |
| 2015/0169069 | A1* | 6/2015 | Lo | G06F 3/011 715/753 |
| 2018/0107441 | A1* | 4/2018 | Aurongzeb | G06F 3/1423 |
| 2020/0301644 | A1* | 9/2020 | Conny Särevall | G09G 5/14 |

\* cited by examiner

*Primary Examiner* — Chris Parry
*Assistant Examiner* — Abderrahmen Chouat
(74) *Attorney, Agent, or Firm* — Fogarty LLP (57) ABSTRACT

As part of virtual meetings, information that has been visually presented to the participants may be distributed to all or some of the participants. Embodiments provide capabilities for identifying such shared information to be distributed to virtual meeting participants based on the context in which the information was shared. A user joining a collaborative session via a first IHS (Information Handling System) is detected and affiliations of the user are determined. The display of information to the user via a collaboration tool is detected. Activity by the user is monitored while the shared information is displayed to the user via the collaboration tool. An event is detected that triggers distribution of the displayed information. Whether to distribute the displayed information to the user's IHS is determined based on the user's affiliations, attributes of the information and the monitored activity of the user during the display of the information.

18 Claims, 4 Drawing Sheets

SYSTEMS AND METHODS FOR DISTRIBUTION OF SHARED CONTENT BASED ON SESSION CONTEXT

FIELD

This disclosure relates generally to Information Handling Systems (IHSs), and more specifically, to supporting collaborative IHS software applications.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some scenarios, a collection of IHSs may be each operated by a different user, with each IHS providing capabilities for its user to participate in a virtual meeting using collaborative tools. In typical virtual meeting scenarios, the collaborative tools in use allow one, some, or all participants to speak during the meeting. Virtual meetings may be conducted with varying levels of collaboration between the participants. On one end of the spectrum, a single participant shares a presentation that includes the display of information to the other meeting participants. On the other end of the spectrum, all users participating in the meeting may share information with the other participants. Various types of information may be shared by virtual meeting participants, including images, presentations, videos, audio, files and documents. The shared information may be physically displayed in a shared space, such as via a conference room projector, and/or may be shared virtually via a whiteboard software application or other shared virtual environment. In some scenarios, users may be allowed to edit and/or annotate information that is shared during a virtual meeting.

SUMMARY

In various embodiments, methods are provided for hosting a collaborative session. The methods may include: detecting a first user joining the collaborative session via a first IHS (Information Handling System); determining a plurality of affiliations of the first user; detecting a display of information to the first user via a collaboration tool, wherein the displayed information is classified based on a plurality of attributes; monitoring activity by the first user while the information is displayed to the first user via the collaboration tool; detecting an event triggering distribution of the displayed information; and determining, based on the affiliations of the first user and further based on the monitored activity of the first user during the display of the information to the first user and further based on the attributes of the information, whether to distribute the displayed information to the first IHS of the first user.

In additional method embodiments, the event triggering distribution of the displayed information comprises the detection of the display of the information to the first user for longer than a first duration. In additional method embodiments, the displayed information is from a first file and the event triggering distribution of the displayed information comprises the detection of the display of a threshold portion of the contents of the first file to the first user. In additional method embodiments, the monitoring of the activity by the first user comprises monitoring a location of the first user relative to the first IHS. In additional method embodiments, the location of the first user relative to the first IHS is determined based on one or more user proximity sensors of the first IHS. In additional method embodiments, the monitoring of the activity by the first user comprises detecting spoken participation by the first user during the display of the first information to the first user via the collaboration tool. In additional method embodiments, the event triggering distribution of the displayed information comprises detection of a key phrase spoken by a participant in the collaborative session. In additional method embodiments, the determination to distribute the information to the first IHS of the first user is further based on whether the monitored activity of the first user during the display of the information surpasses a threshold level. In additional method embodiments, the determination to distribute the information to the first IHS of the first user is further based on the first user being detected in proximity to a second IHS of a second user participating in the collaborative session.

In various additional embodiments, a first Information Handling System (IHS) is configured for supporting participation in a collaborative session by a first user of the first IHS. The first IHS may include: a plurality of sensors; a sensor hub comprising a logic unit configured via firmware instructions to determine a user context based on inputs from the plurality of sensors; one or more processors; one or more memory devices coupled to the processors, the memory devices storing computer-readable instructions that, upon execution by the processors, cause operating system applications of the first IHS to: determine the first user has joined the collaborative session via a client application of a collaboration tool; determine a plurality of affiliations of the first user; detect a display of information to the first user via the client application of the collaboration tool, wherein the displayed information is classified based on a plurality of attributes; monitor the user context of the first user while the information is displayed to the first user via the client application of the collaboration tool; detect an event triggering distribution of the displayed information; and receive the displayed information, wherein distribution of the displayed information to the first IHS is determined by the collaborative tool based on the affiliations of the first user and further based on the monitored activity of the first user during the display of the information to the first user via the client application and further based on the attributes of the information.

In additional IHS embodiments, the plurality of sensors comprise one or more user proximity sensors and the monitored user context of the first user comprises a location of the first user relative to the first IHS as determined using the user proximity sensors. In additional IHS embodiments, the plurality of sensors comprise an RFID (Radio Frequency Identification) sensor and wherein the monitored user context of the first user comprises a location of the first user relative to the first IHS as determined using the RFID sensor. In additional IHS embodiments, the plurality of sensors comprise one or more gaze detection sensors and wherein the monitored user context of the first user comprises determining whether a gaze of the first user is focused on the client application of the collaboration tool. In additional IHS embodiments, the plurality of sensors comprise one or more microphones and wherein the monitored user context of the first user comprises identifying spoken participation in the collaborative session during the display of the information via the client application of the collaboration tool. In additional IHS embodiments, the event triggering distribution of the displayed information comprises detection of a key phrase spoken by a participant in the collaborative session. In additional IHS embodiments, the determination to distribute the information to the first IHS is further based on whether the monitored activity of the first user during the display of the information surpasses a threshold level.

In various additional embodiments, computer-readable storage devices have instructions stored thereon for supporting participation in a collaborative session by a first user of a first IHS (Information Handling System). Execution of the instructions by one or more processors of the first IHS causes the one or more processors to: determine the first user has joined the collaborative session via a client application of a collaboration tool; determine a plurality of affiliations of the first user; detect a display of information to the first user via the client application of the collaboration tool, wherein the displayed information is classified based on a plurality of attributes; monitor the user context of the first user while the information is displayed to the first user via the client application of the collaboration tool; detect an event triggering distribution of the displayed information; and receive the displayed information, wherein distribution of the displayed information to the first IHS is determined by the collaborative tool based on the affiliations of the first user and further based on the monitored activity of the first user during the display of the information to the first user via the client application and further based on the attributes of the information.

In additional storage device embodiments, the event triggering distribution of the displayed information comprises the detection of the display of the information to the first user for longer than a first duration. In additional storage device embodiments, the displayed information is from a first file and the event triggering distribution of the displayed information comprises the detection of the display of a threshold portion of the contents of the first file to the first user. In additional storage device embodiments, the monitoring of the activity by the first user comprises monitoring a location of the first user relative to the first IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
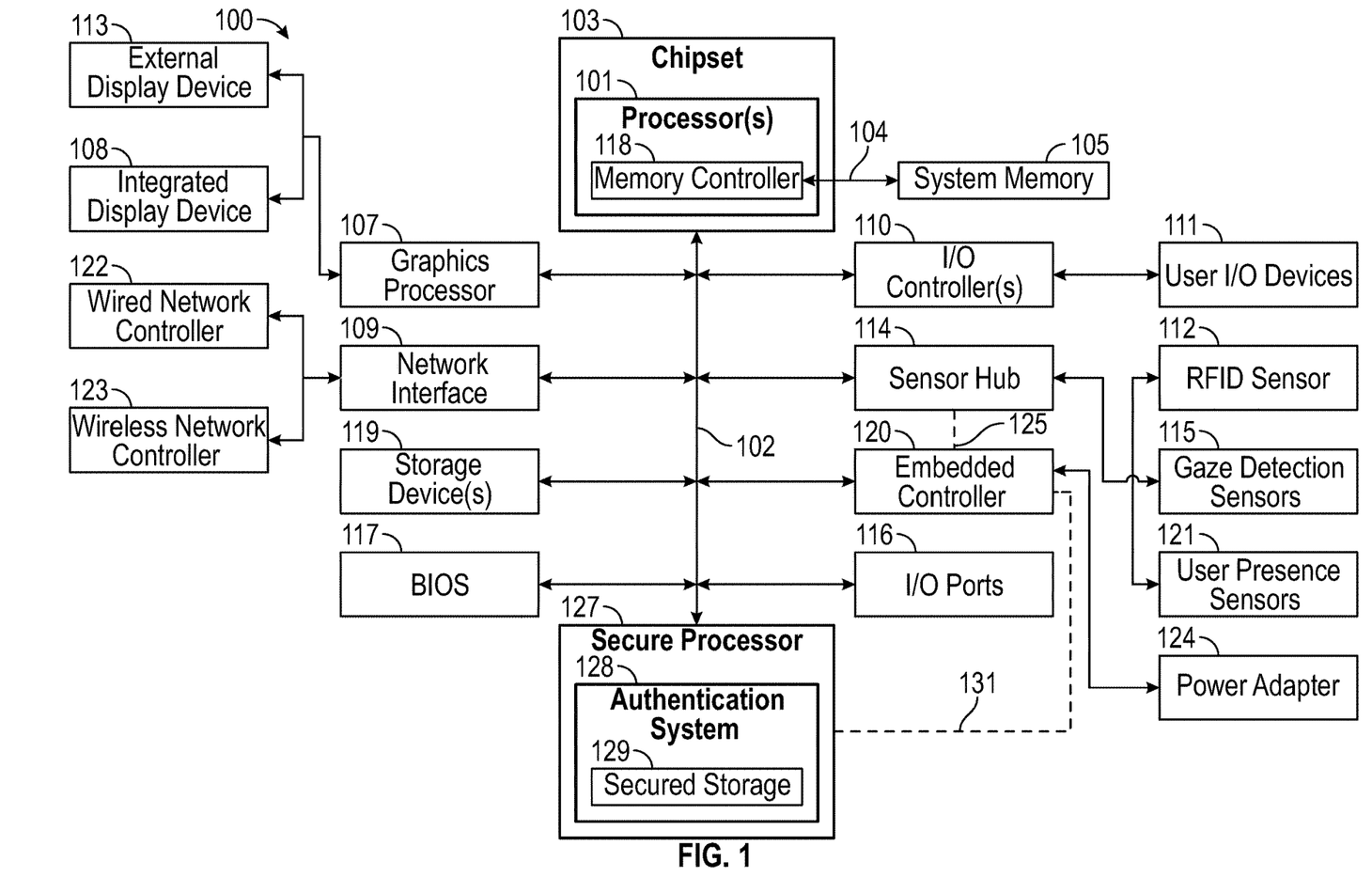
FIG. 1 is a block diagram depicting certain components of an IHS configured according to various embodiments for the distribution of content shared during a collaborative session based on session context.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

An IHS may support the operation of collaborative tools that allow the user of the IHS to participate in a virtual meeting with other individuals. The collaborative tools supported by an IHS may allow the user of the IHS to participate to various manners and to share various types information with the other individuals participating in the virtual meeting. The information shared by the user of the IHS, such as documents, may be information stored on the IHS or may be information stored remotely from the IHS, such as information stored on a cloud resource. Via the collaborative tools supported by an IHS, a user may participate in all or a portion of a virtual meeting. The participants in a virtual meeting may be classified in various manners, such as based on organizational affiliations and based on authorized responsibilities of the participants. During a virtual meeting or after a virtual meeting has concluded, the shared information may be distributed to all or some of the participants. Embodiments provide capabilities for identifying the shared information to be distributed to virtual meeting participants based on the context in which the information was shared during the virtual meeting.

FIG. 1 is a block diagram illustrating certain components of an IHS 100 configured according to certain embodiments for distributing of content that has been shared during a virtual meeting based on the context of the virtual meeting. IHS 100 may support various types of collaborative tools that allow the user of IHS 100 to interact with one or more users of other IHSs, which, in some instances, may be configured in the same or similar manner as IHS 100. During collaborative sessions, the user of IHS 100 may share information in various forms with other participants in the collaborative session. For instance, the collaborative tools available on IHS 100 may allow a user to share information that is displayed in a desktop or other virtual environment with the other participants in the collaborative session, such as via a screen sharing capability. In other instances, the collaborative tools available on IHS 100 may allow a user to share information via a virtual whiteboard or other tool that provides participants with a shared environment for posting various types of information. As described in additional detail below, IHS 100 may be configured according to various embodiments to support the distribution of shared information based on the context of such collaborative sessions. In various embodiments, IHS 100 may include an embedded controller 120 and/or a sensor hub 114 that may each execute program instructions that cause each of these components to perform certain of the operations disclosed in support of the distribution of shared content based on session context.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100. In certain embodiments, network controllers 122 and/or 123 may utilize network I/O ports 116 for establishing network connections with external systems.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state. As illustrated, IHS 100 may support an integrated display device 108, such as a display integrated into a laptop, tablet, 2-in-1 convertible device, or mobile device. IHS 100 may also support use of one or more external displays 113, such as external monitors and projectors that may be coupled to IHS 100 via various types of couplings, such as by connecting a cable from the external display 113 to an external I/O port 116 of the IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

In various embodiments, 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of physical I/O ports accessible to a user via the enclosure of the IHS 100, where these physical I/O ports support couplings that may connect IHS 100 with external devices and systems, such as couplings established with USB compatible devices via USB ports supported by IHS 100.

In certain embodiments, chipset 103 may utilize one or more I/O controllers 110 that may each support hardware components such as user I/O devices 111. For instance, I/O controller 110 may provide access to one or more user I/O devices 110 such as a keyboard, mouse, touchpad, microphone, speakers, camera and other input and output devices that may be coupled to IHS 100. Each of the supported user I/O devices 111 may interface with the I/O controller 110 through wired or wireless connections.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as secure processor 127, in order to establish a hardware root of trust that includes the trusted component that may then be utilized to support certain secure operations of IHS 100, such as user authentication.

In the illustrated embodiment, a secure processor 127 may be a hardware component that has been validated as a trusted resource of IHS 100 and that provides an isolated execution and memory environment for supporting secure operations. In certain embodiments, secure processor 127 may be a component of a system-on-chip that has been configured to implement secure operations of IHS 100. In such embodiments, secure processor 127 may be a component of a removeable, expansion card that is coupled to the motherboard of IHS 100. In certain embodiments, secure processor 127 may include an FPGA (Field Programmable Gate Array) that has been configured to implement certain secure management functions, where the instructions utilized by the FPGA are validated using hardware instructions in order to assure the integrity of the described hardware management functions performed by the FPGA. In certain embodiments, the secure processor 127 may an embedded controller or processor that is a motherboard component of IHS 100, where the firmware instructions utilized by the embedded controller are validated in order to assure the integrity of the described authentication functions.

In certain embodiments, secure processor 127 may operate a secure execution environment that operates based on validated firmware instructions. Via functions provided by the secure execution environment, the secure processor 127 may operate an authentication system 128 that provides the ability to authenticate a user of IHS 100, and in some instances, the ability to authenticate other individuals identified in proximity to the IHS 100. In certain embodiments, authentication system 128 provides a mechanism for secure user authentication that is independent from the operating system utilized by IHS 100. In some embodiments, authentication system 128 of secure processor 127 may include a secure storage 129 that may be used to store authentication data such as biometric reference data, where this authentication data is isolated from the operating system of IHS 100 and is accessible only by secure processor 127.

In some embodiments, secure authentication system 128 may utilize an out-of-band communication pathway, such as GPIO (general-purpose input/output) pins 130 coupled to signal pathways 131, in order to receive user context information from an embedded controller 120. In various embodiments, the user context information provided to the secure authentication system 128 by the embedded controller 120 may include information used to identify the user of IHS 100, or other individuals in proximity to IHS 100. For instance, embedded controller 120 may utilize signaling pathway 125 to collect information from various sensors 112, 115, 121 supported by a sensor hub 114. This collected sensor information may include RFID information captured by an RFID sensor 112, where the RFID information may be collected based on detected RFID tags that are embedded in badges or other forms of identification that are worn by individuals. In such embodiments, RFID information may be transmitted to authentication system via signal pathway 131 and used to identify individuals in proximity to IHS 100 based on RFID information maintained in a secure storage 129, such as RFID signatures associated with the user of IHS 100 and the RFID signatures of individuals affiliated with the user of IHS 100.

Embedded controller 120 may also collect additional user-identifying information that is captured using other input devices coupled to IHS 100, such as from a microphone and from a camera. Collected images and audio may also be provided to authentication system 128 via signal pathway 131 for use in identifying the user of IHS 100, as well as in identifying other individuals in proximity to IHS 100. For instance, voice prints collected from a microphone of IHS 100 may be provided to authentication system 128 and compared against reference voice prints maintained in a secure storage 129 in order to identify individuals in proximity to IHS 100, such as the user of IHS 100 and individuals affiliated with the user of IHS 100. In other instances, images collected from a camera of IHS 100 may be provided to authentication system 128 and compared using facial recognition techniques against reference data maintained in a secure storage 129 in order to identify individuals in proximity to IHS 100.

As described, sensor hub 114 may collect information from various sensors, including an RFID sensor 112 capable of detecting RFID tags in proximity to IHS 100. Other sensors that may include user presence sensors 121, such as optical, infrared and sonar sensors, that may provide data used by sensor hub 114 to provide an indication of a user's presence near IHS 100 and may also be used to determine a distance of a user from IHS 100. In some embodiments, such optical, infrared and sonar sensors may also be utilized by sensor hub 114 in supporting xR (virtual, augmented, mixed reality) sessions hosted by the IHS 100. In certain embodiments, sensor hub 114 may be configured to incorporate audio information in determining a user's presence near IHS 1000. For instance, sensor hub 114 may receive information from an audio I/O subsystem that includes ultrasonic audio transmission and reception capabilities. Based on such audio information, sensor hub 114 may determine, at least in part, a user's presence near IHS 100. In a similar manner, sensor hub 114 may also incorporate certain network signal information in determining a user's presence near IHS 100. For instance, sensor hub 114 may utilize the described BLUETOOTH transmission and reception capabilities of IHS 100 in order to detect a user's presence in proximity to IHS 100.

As illustrated, sensor hub 114 may also rely on gaze detection sensors 115 that may be used to determine the direction of a user's gaze. For instance, gaze detection sensors 115 may utilize a camera that captures high-frame-rate images of the user's eyes. In some instances, gaze detection sensors 115 may also project a pattern of infrared or (near-infrared) light on the user's eyes. Based on detected movement of the user's pupil relative to the projected pattern, gaze detection sensors 115 may determine a focus point of the user's gaze. Using this focal point determined by the gaze detection sensors 115, sensor hub 114 may determine whether the user is looking at the IHS 100. If the user is determined to be looking at the display of IHS 100, sensor hub 114 may further identity the specific displayed user interface, such as the user interface of a client collaboration tool application, that is the focus of the user's gaze.

In certain embodiments, sensor hub 114 may also include capabilities for determining a location and movement of IHS 100 based on triangulation of network signal and based on network information provided by the operating system or a network interface 109. For instance, sensor hub 114 may use triangulated network signal information to determine a user's location within a specific building or within a specific room. In certain embodiments, sensor hub 114 may be capable of determining the relative orientation and movement of IHS 100. For instance, sensor hub 114 may utilize inertial movement sensors 115, that may include accelerometer, gyroscope and magnetometer sensors and are capable of determining the current orientation and movement of IHS 100 (e.g., determining IHS 100 is motionless on a relatively flat surface or IHS 100 is being moved irregularly and is likely in transport).

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the RFID sensor 112, gaze detection sensors 115 and user presence sensors 121. Sensor hub 114 may collect and processes data from such sensors using data fusion techniques in order to determine contextual information regarding the operational state of IHS 100 for use in determining information to be distributed to participants in a collaborative session.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus from the operating system functions of IHS 100. Firmware instructions utilized by embedded controller 120 may be used to operate a secure execution environment that may include operations for providing various core functions of IHS 100, such as power management, management of operating modes in which IHS 100 may be physically configured (e.g., determining a mode of a convertible laptop IHS based on the current hinge angle of the IHS reported by sensor hub 114) and support for certain integrated I/O functions.

Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. Embedded controller 120 may also implement operations for detecting any changes to the physical configuration of IHS 100 and managing the modes corresponding to different physical configurations of IHS 100. For instance, in embodiments where IHS 100 is a laptop computer or a convertible laptop computer, embedded controller 120 may receive inputs from a lid position sensor that may detect whether the two sides of the laptop have been latched together to a closed position. In response detecting latching of the lid of IHS 100, embedded controller 120 may initiate operations for shutting down IHS 100 or placing IHS 100 in a low-power state. In certain embodiments, embedded controller 120 may be configured to place IHS 100 in a low-power state based on various conditions, such as based on a detected period of inactivity. In some embodiments, such power status information and mode information in which IHS 100 is physically configured may be reported by embedded controller and utilized by a collaboration tool in determining that the user of IHS 100 is not participating during a portion of a collaborative session.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
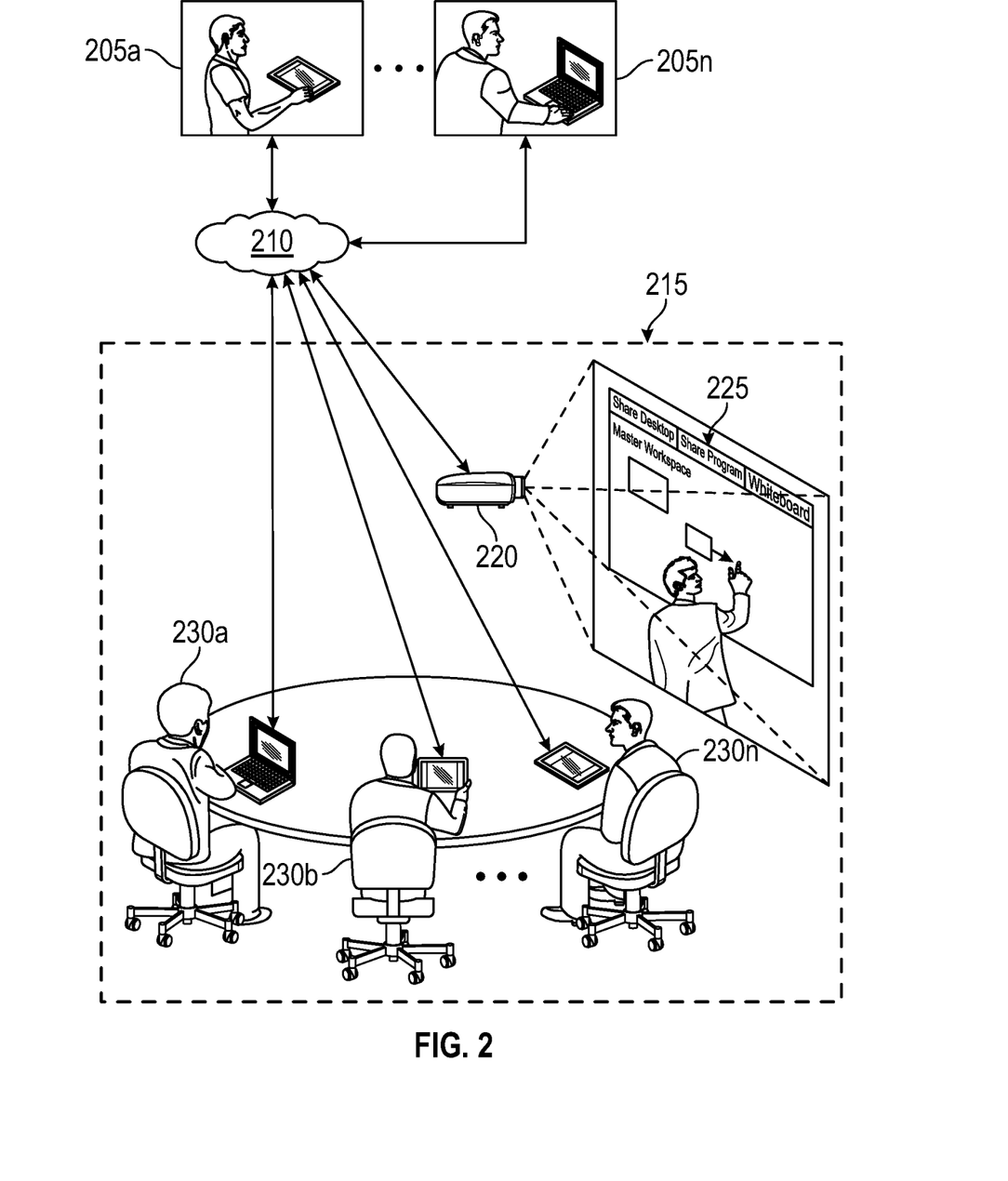
FIG. 2 is an illustration depicting an environment in which embodiments may operate in providing distribution of content shared during a collaborative session based on session context.

FIG. 2 is an illustration depicting an environment in which embodiments may operate in providing distribution of content shared during a collaborative session based on session context. As described, users of IHSs may participate in virtual meetings, where collaboration tools allow the users to share information with the other participants of the virtual meeting. In the illustrated scenario, a virtual meeting is being conducted that includes co-located participants 230a-n that are all located in environment 215, such as within a conference room. The virtual meeting also includes remote participants 205a-n that are not located in room 215, but may themselves be all or partially co-located. In other scenarios, a virtual meeting may include only in-room participants 230a-n, or may include only remote participants 205a-n. Accordingly, a virtual meeting may include any number of in-room participants 230a-n and any number of remote participants 205a-n. Each participant may each operate a respective IHS, such as described with regard to FIG. 1, including, for example, desktops, laptops, tablets, or smartphones.

In typical scenarios, the virtual meeting may be conducted using a collaboration tool that allows the participants 230a-n, 205a-n to share information. In some instances, collaboration tool may be a software application that runs at least in part on a remote resource 210, such as a cloud network or an enterprise computing network, while the IHSs or other devices used by each participant 230a-n, 205a-n may operate a local client software application that is supported by the collaboration tool. Accordingly, remote resource may include any number or servers and networks that enable communications between two or more of IHSs. In some instances, the collaboration tool operates as a central meeting host that includes tools for scheduling and initiating virtual meetings. Once a virtual meeting has been initiated, collaboration tool provides capabilities for participants to share information using their local client applications.

A collaboration tool may support various capabilities that allow participants to share information during the virtual meeting. In the illustrated scenario, collaboration tool supports sharing of information through display by a projector 220 within room 215. In-room participants 230a-n may view the display of projector 220. Both remote participants 205a-n and in-room participants 230a-n may view that same output as generated by projector 220 via the client application running on the respective IHSs of these participants. In some scenarios, one of the participants may have control of the output of projector 220 and may select the information that is displayed and thus that is shared with the other meeting participants. In some instances, the participant in control of the output of projector 220 may share information for display by sharing a view of their desktop or a view of another environment operating on their IHS. In other instances, the output of projector 220 may be a shared workspace supported by the collaboration tool, such as a virtual whiteboard, that allows participants to share, and in some cases, to edit information. In such instances, the client applications supported by the collaboration tool may also display this shared workspace and may also allow participants to share and edit information that is presented in the shared workspace.

In many scenarios, in-room participants 230a-n and remote participants 205a-n participating in a virtual meeting may be associated with various different classifications. For example, a moderator or presenter may control the virtual meeting and the information that is shared with the other participants. Various different participants may be a moderator or presenter during the course of a virtual meeting. In some instances, the participants 205a-n, 230a-n in the virtual meeting may be classified based on their individual organizational affiliations. For instance, some of the participants in the virtual meeting may be associated with different companies or with different public agencies. In another example, some of the participants may be classified based on their organizational assignments within a company, such as designations as being legal, engineering, finance or management staff members. The participants 205a-n, 230a-n may also be classified based on authorizations of these participants to receive certain information, such as a security clearance classification or an indication that user has agreed to a non-disclosure agreement.

As described, during the course of a virtual meeting, participants may come and go from the meeting. In some instances, a participant may leave permanently, which may include powering down their IHS and leaving the location from which they are participating in the virtual meeting. In other instances, a participant may leave the virtual meeting temporarily, such as to take a phone call. In some instances, an individual may continue to participate in a virtual meeting to some level, but may also conduct other tasks, which may include other tasks conducted on their respective IHS, such as checking email, and other tasks that do not involve use of their respective IHS, such as conversing with another person. Also as described, different content may be shared by various different participants throughout the course of a virtual meeting. Accordingly, the context of a virtual meeting may shift throughout the meeting as different sources of information are shared and as different individuals participate to varying degrees in the virtual meeting. Embodiments support determining which shared information to distribute to virtual meeting participants based on these ongoing changes in the context of the virtual meeting.

Figure 3:
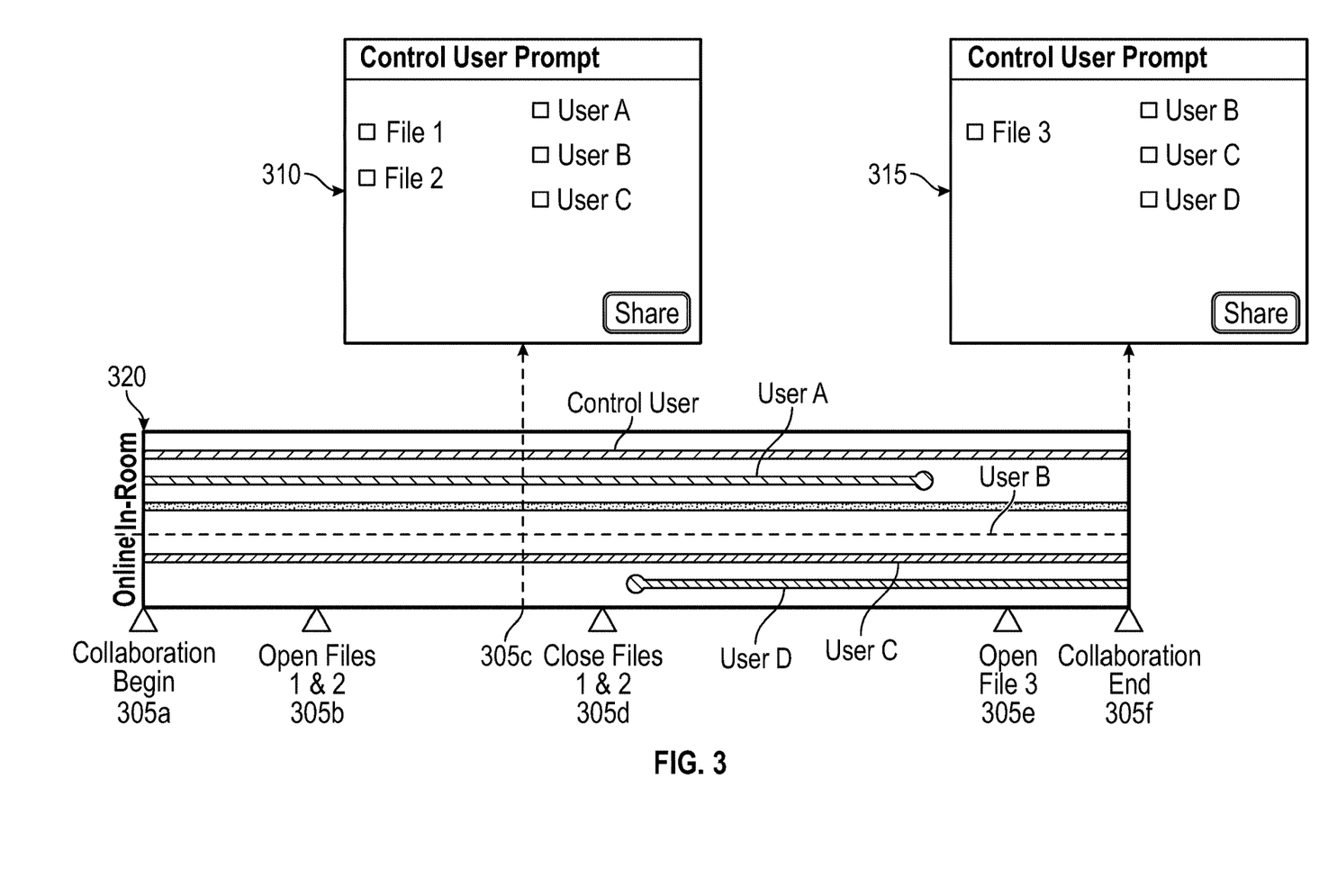
FIG. 3 is an illustration depicting certain aspects of the operation of a system configured according to embodiments for distribution of content shared during a collaborative session based on session context.

FIG. 3 is an illustration depicting certain aspects of the operation of a system configured according to embodiments for distribution of content shared in a collaborative session based on session context. FIG. 3 includes a timeseries 320 that illustrates the participation of various users in a collaborative session, such as a virtual meeting, where the timeseries 320 illustrates the duration of each user's participation and also illustrates points of time at which specific sources of content are shared via the collaborative session. As described, a virtual meeting may be conducted under the control of one or more participants that may share content with the other participants in the virtual meeting. At time 305a, the collaborative session is initiated with four users participating, where three users (a control user, user A, and user B) are co-located in the same room and one user (user C) is located remotely. As described with regard to FIG. 2, the users may each participate in the collaborative session via a collaborative tool that may support streaming audio and video feeds from each participant and may also support a workspace that allows content to be displayed for viewing by all participants. In some instances, each user may participate in the collaborative session via a local client software application of the collaborative tool, where the local client may operate on a user's IHS such as described with regard to FIG. 1.

As illustrated in the timeseries 320 of FIG. 3, the collaborative session that is initiated at time 305a continues until time 305b when the control user opens two files that are then used to display content that is shared with the other collaborative session participants, namely users A, B and C. As described, the control user may display information for sharing in various manners, such as by sharing a view of their desktop and/or by projecting content for physical display. For instance, the control user may be displaying information from the two files via a projector in the room in which user A and user B are located and via a local client of the collaboration tool that is operating on the IHS of user C.

At time 305c of the timeseries 320, an event triggering distribution of shared content is detected. In some embodiments, the control user may generate such an event through selection of a user interface option provided by the collaboration tool. For instance, the user interface of the control user may provide a button, keyboard shortcut, menu option, voice command or other form of user input that signals for distribution of content that has been shared thus far in a virtual meeting. In some embodiments, participants other than the control user may generate such an event through a similar user interface option provided by the collaboration tool. Such embodiments would allow user A to initiate distribution of shared content at time 305c through selection of a provided user interface option of the collaboration tool. In some instances, such requests for distribution of shared content by a non-control participant may initiate distribution of the content to just the requesting user, while in other instances such requests by non-control participant may initiate distribution of the content to all participants. These embodiments allow participants to gain access to shared content during the course a virtual meeting without having to rely on the control user to initiate the distribution, and in some instances, without distracting the control user from their ongoing presentation via the collaboration tool. As described in additional detail below, such mechanisms for initiating distribution of shared content by participants may be subject to various rules and controls, such as limiting actual distribution to participants that are closely affiliated with the participant initiating the distribution.

In other embodiments, the event that triggers distribution of shared content may be automatically generated by the collaboration tool. For instance, in some embodiments, the collaboration tool may automatically initiate distribution of shared content upon detecting a threshold level of sharing of that particular content during a virtual meeting. In the virtual meeting represented in timeseries 320, the event at time 305c may be generated automatically by the collaboration tool upon detecting ongoing sharing of content from these two files since the time the files were opened by the control user at time 305b. The use of such time thresholds for initiating automatic sharing may be selected in order to exclude sharing of content that is only briefly displayed, while including content that is displayed for significant intervals. In some embodiments, time thresholds for triggering automatic distribution of shared content may be augmented or replaced by measures of the amount of information available for display within a file that is actually shared, such as a percentage of the available content in the file that is actually shared. For instance, the display of only the first several slides of the presentation may not trigger automatic distribution, while the display of every slide or a more than 50 percent of the slides in the presentation may serve to trigger automatic distribution.

As described, a control user may initiate distribution of shared content through selection of a user interface option provided by the collaboration tool. In some embodiments, the collaboration tool may respond to such selections by presenting the control user with a user interface display 310. In some embodiments, the collaboration tool may also present a user with user interface display 310 upon detecting a triggering event that was automatically generated. As illustrated, the user interface 310 provides the control user with a selection of the content shared thus far in the virtual meeting and a selection of the participants at this point in the virtual meeting. Via this user interface 310, the control user may initiate sharing of two files with the virtual meeting participants, user A, user B and user C. As described in additional detail with regard to FIG. 4, collaboration tool embodiments may implement various conditions for selection of content for sharing. Accordingly, user interface 310 may prohibit sharing of certain content with certain users, or at least require the control user to confirm certain distributions of shared content, such as with users that are affiliated with different organizations from the organization of the control user.

Upon distribution of the two files, the virtual meeting may continue as indicated in timeseries 320 with the closing of the two files by the control user at time 305d. As illustrated, subsequent to closing of the two files at time 305d, a new user D joins the ongoing collaborative session remotely. At a later time in the collaborative session, user A leaves the session. As described in additional detail with regard to FIG. 4, a user leaving the session may be determined based on the user terminating the local collaboration tool client application and may also be determined based on detecting various other conditions, such as a user leaving their IHS unattended and/or leaving the room in which the shared information is being displayed. As illustrated in the timeseries 320 of the virtual meeting, at time 305e, the control user opens a third file for display to the participants. At time 305f, another event that triggers distribution of shared content is detected.

As with the distribution trigger at time 305c, the distribution at time 305f may be manually generated by the selection of a user interface option by the control user or by another participant, or may be automatically generated by the collaboration tool, such as based on a detected threshold of sharing of the information in the third file. In response to detecting the distribution trigger, the collaboration tool may provide the control user with user interface 315 for selection of shared content for distribution. As illustrated, user interface 315 provides the control user with a selection of the new content that has been shared since the prior distribution at time 305c. Also as illustrated, user interface 315 also provides the control user with a selection of the current participants of the virtual meeting, and thus does not include user A who left the session prior to the control user opening a third file at time 305e. In some embodiments, collaborative tool may be configured to instead support delivery of the third file to user A, even though user A left the meeting prior to that file being shared. For instance, prior to leaving the session or as a default preference specified via the collaboration tool, user A may specify a preference to receive distribution of all information shared during a collaborative session, even if user A was not present when the information was shared. In a similar manner, upon joining the collaborative session, user D may be provided with an option for electing distribution of all files shared during the collaborative session, even though user D arrived after the first two files were shared.

Figure 4:
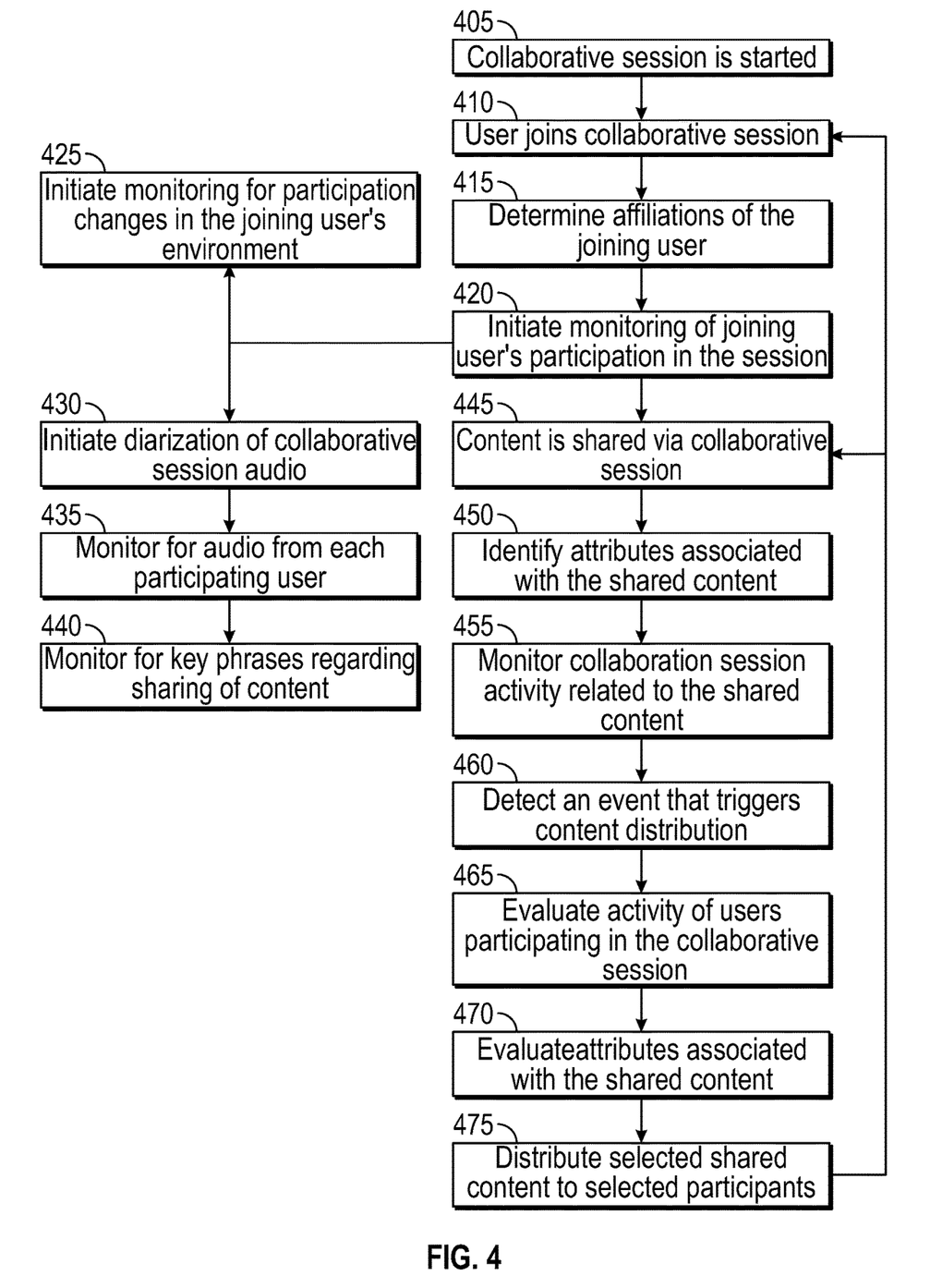
FIG. 4 is a flowchart diagram illustrating certain steps of methods according to embodiments for distribution of content shared during a collaborative session based on session context.

FIG. 4 is a flowchart diagram illustrating certain steps of methods according to embodiments for distributing content that was shared during a collaborative session based on session context. Some embodiments may begin at block 405 with the initiation of a collaborative session using a collaborative tool, such as in the virtual meetings described above. At block 410, the collaborative tool may detect a user joining the collaborative session. In some instances, one or more users joining the collaborative session may be designated as control users and, based on such designations, may be provided with additional capabilities by the collaboration tool. As described regard to FIG. 3, some collaborative sessions may include users leaving and joining an ongoing session. Accordingly, block 410 may correspond to users joining the collaborative session upon its initiation, or may correspond to new users joining an ongoing collaborative session.

At block 415, the collaborative tool may determine various affiliations associated with a joining user. In a corporate environment, affiliations may correspond to corporate associations for the joining user, such as whether the joining user is a member of a corporation's engineering, human resources, or finance group. In a collaborative session including users from different organizations, affiliations may identify the joining user's organization, such as a company or public agency that employs the user. In some instances, affiliations may also serve to specify a user's prior vetting for receipt of certain information, such as a security clearance classification or an indication that the user has agreed to a non-disclosure agreement. In some instances, affiliations may also serve to specify whether a user has complied with certain requirements for distribution of shared information, such as whether the user has agreed to a distribution fee or whether the user is a sufficiently identified registered participant in the collaborative session.

Once a joining user has been admitted to the collaboration session, at block 420, monitoring of the joining user's participation in the session may be initiated. As described, some participants, including all remote participants, in a collaborative session may participate via a client software application of the collaborative tool. In such instances, a user's participation in the session may be characterized by embodiments in part based on the display of the client software application on the user's screen. For instance, a user may be characterized as only a partial participant, or even a nonparticipant, if the client software application remains obscured by other windows in the user's desktop or runs only as a minimized application with no display. In some embodiments, the user's participation level may be quantified at least in part based on the degree to which the client software application remains visible on the user's desktop.

In some embodiments, the user's participation level may be further characterized based on audio from the user that is captured by the collaboration tool. For instance, a user may use audio capabilities of the collaboration tool in order to provide comments or ask questions. Based on such audio input, a user may be characterized as a full participant in a collaborative session, even if the client software application is only intermittently visible on the user's desktop. The user's participation level may be further characterized based on their configuration of the audio output from the collaboration session, such as whether the user mutes the audio output from the collaboration tool client application.

As described with regard to FIG. 1, an IHS according to embodiments may include gaze detection sensors that are configured to track the gaze of a user that is operating the IHS. In such embodiments, the user's gaze may be tracked during a collaborative session in order to determine whether the user is looking at the presented content or is looking elsewhere, such as looking at an application that is displayed in a different monitor from the monitor being used to display the user interface of the collaborative tool, or such as looking at another device. Based on such gaze tracking information, an IHS may determine intervals during which a user's gaze appears to be focused on the collaborative session and intervals when the user's gaze appears to be focused elsewhere. These intervals of gaze detection information may be reported to the collaborative tool which may be used in conjunction with other indicators of a user's participation, such as captured audio from the user, in order to characterize a user's level of participation during various intervals of a collaborative session.

As indicated in FIG. 4, additional monitoring may be initiated at block 425 for changes in participation in the user's environment. As described with regard to FIG. 1, an IHS according to embodiments may be configured with various sensors that may be used in monitoring various aspects of the environment in which the IHS is located. For instance, an IHS may include an RFID sensor that may be configured to detect RFID tags worn by users and/or RFID tags placed at specific locations. Using such RFID sensor capabilities, an IHS may detect an RFID tag embedded in a badge worn by a user in order to determine whether the user is within a certain proximity to the IHS. If the RFID tag is not detected within this proximity to the IHS, the collaboration tool may be notified of this change. The collaboration tool may thus denote a lack of participation by the user during intervals where the user's RFID tag is not detected in proximity to the IHS, unless the user's proximity is detected by another means, such as voice print recognition that confirms the user is within an audible proximity to the IHS.

As described with regard to FIGS. 2 and 3, collaborative sessions may be conducted in which some of the users may be co-located, such as within a conference room. In such scenarios, a first participant may temporarily leave their IHS in order to confer with a second participant in the same conference room. The IHS of the second participant may thus detect the RFID tag of both the first participant and the second participant. The collaboration tool may then be notified of the detected presence of both participants during this interval due to both of their RFID tags being detected in proximity to the IHS of the second participant. In the same manner, the RFID tag worn by a participant that is away from their IHS may nonetheless be detected by other RFID sensors that confirm the participant's presence within the conference room in which the collaborative session is being conducted, or at least deduce that the participant has not left the conference room. Such deductions may be strengthened based on various other sensor data collected by an IHS, such as based on the described ultrasonic audio and BLUETOOTH network transmission and reception capabilities that may detect an individual's presence in proximity in proximity to an IHS and/or further based on captured image data that may identify a specific individual using facial recognition techniques.

As described with regard to FIG. 1, an IHS may be configured with various additional sensors that may be used to detect a user's presence in proximity to the IHS. For instance, an IHS may include optical, infrared, ultrasonic, network and/or sonar sensors that can detect whether a user is present near the IHS. In some instances, an IHS may use such optical sensors to capture an image of a user's face, where this image may be used by a facial recognition capability of an authentication system of the IHS in order to confirm the identity of the user. If multiple individuals are detected in proximity to an IHS, images of each of their faces may be captured and used by the authentication system of an IHS to confirm their identities. Other user presence sensors of an IHS may be unable to identify a specific individual, but may be able to confirm that no individuals are detected within a proximity to the IHS, such that the IHS is unattended. As with the detection of participants based on RFID sensors, the detection of a participant or the inability to detect a participant based on user presence sensors may be similarly be reported to the collaboration tool.

As indicated in FIG. 4, upon initiating monitoring of the joining user's participation in a collaborative session, at block 430, embodiments may also initiate diarization of audio from the collaborative session. For example, the collaborative tool may capture audio from the microphone of each participating IHS and may also capture audio from environments in which multiple participants are co-located, such as from a conference room. The collaborative tool may utilize speech recognition tools that include diarization capabilities in order to separate speech from different participants and to identify each speaker. At block 435, audio from each participant is monitored and used to evaluate a level of spoken participation by each participant and to identify intervals without any spoken participation by each participant.

In some embodiments, at block 440, the speech recognition tools may be further utilized to identify the use of certain key phrases in the monitored spoken participation. For instance, the speech recognition tools may detect instances of a participant saying phrases such as "I will send this out to everyone," "please have this circulated," and other such phrases that may be customized by individual users according to capabilities provided by the collaboration tool. Upon detecting such key phrases, the collaboration tool may identify the sources of information that are currently being shared via the collaboration tool. As described with regard to FIG. 3, the detection of key phrases may serve as an event triggering automatic distribution of content, where the content that is selected for distribution may be based on the sources of information that are currently being shared in a collaborative session and based on the current participants in the collaborative session.

With the monitoring of participation in the collaborative session initiated, at block 445, a source of content may be shared via the capabilities provided by the collaborative tool. In various scenarios, the shared content may be document, image, video, audio or any other source of information that can be shared via the collaborative tool with other participants in a collaborative session. At block 450, one or more attributes associated with the shared content may be identified. In some instances, attributes for a source of content may be attributes associated with a file that is the source of the content. For instance, a file may be associated with attributes that specify permission levels for use of the file. Such permission levels associated with files may be utilized by the collaboration tool to determine conditions for distributing the files. For example, in scenarios where a user has read-only permissions for use of a file, the collaboration tool may be configured to restrict or outright prohibit distribution of such files by that particular user. A user with read and write permissions for use of the file may be allowed by the collaboration tool to initiate distribution of the file to any participants, or any participants that are not otherwise restricted, such as due to the affiliation with another company. Attributes associated with shared content may take on various other forms. For instance, a security clearance classification may be associated with a file, where the security classification may be specified in file attributes, file names, document headers and/or file metadata. Attributes associated with shared content may also include indications that the content includes financial information, customer information and/or personal data that warrant limiting the distribution of this content to authorized participants. Such indications of restricted content may be determined based on metadata associated with a file and/or based on textual analysis of the contents of a file.

With content being shared and its attributes identified, at block 455, the collaboration tool monitors activity in the collaboration session related to a shared source of information. For instance, the collaboration tool may monitor a control user's navigation through a shared source of information, such as progressing through the slides of the presentation, or through the pages of a document. As described, such use of a shared document may be characterized based on factors such as the length of time the control user displays the document and/or the portion of a document content that is shared. For some participants, such as those participating remotely via a client application, the participant's activity related to a specific document may be determined based on gaze detection that indicates the participant is actively looking at the document as it is displayed by the collaboration tool client application. As described, the participant's activity related to a specific document may also be determined based on detected spoken participation by that participant during the display of that document. In some embodiments, a participant's activity related to a specific document may be determined based on the detection of the participant taking notes during the display of the documents, such as may be indicated by the participant copying and pasting content from the shared document. In some embodiments, a participant's activity related to a specific document may be determined based on the user's inputs to the collaboration tool during the display of the document, such as through submission of written questions, using capabilities for marking items of interest and by contributing edits to the document.

At block 460, the collaboration tool detects events that trigger distribution of content. As described, such events may be generated manually by users through the selection of user interface options provided by the collaboration tool, generated automatically based on the detection of spoken key phrases by participants and/or generated automatically by the collaboration tool based on various conditions, such as detecting a threshold amount of sharing of an information contained in a content source. Upon detecting an event triggering distribution of content, at block 465, the collaboration tool evaluates the activity of users participating in the collaborative session. In certain instances, the collaboration tool may be configured to distribute shared content only to participants that have exhibited a minimum level of participation during the display of the content. For instance, in a scenario where a participant is determined to not be in proximity to their IHS throughout the display of the shared content and no other indications of participation by that user are identified, the collaboration tool may be configured to omit such users from the distribution of the shared content. As described, a user's participation level with respect to a source of shared information may be determined based on various factors, including monitoring of the users spoken participation, monitoring the user's gaze, monitoring the software applications that are being utilized by the user, contributing edits and monitoring user inputs to the collaboration tool. In some embodiments, a user's participation level may be based in part based on the user's prior history as maintained by collaboration tool. For instance, a user with a long history of regular participation over multiple collaborative sessions may be deemed to be a full participant in a collaborative session despite a lack of positive indications of such participation by the user.

At block 470, the attributes associated with the shared content may be evaluated. For instance, a security classification denoting highly restricted information may prohibit any distribution of the document by the collaboration tool. In another instance, such security classifications may limit distribution of the document only to certain participants that can be confirmed as being authorized for receipt of such information. For instance, a shared source of content including financial information may be limited to distribution to members of a corporate finance team. In another example, a shared source of information containing engineering information may be limited to distribution to members of a technical team and may be prohibited from distribution to members of outside organizations that may be participating in the collaborative session. Similarly, shared sources of information with personal information may be limited to distribution to members of a human resources team. Other documents may be associated with attributes that denote unlimited distribution of the document, such as open source code and reference documents that are publicly available. In some embodiments, determinations regarding whether to share a specific information source with a particular participant may be determined based on an established history of interactions between the participant and the control user. For instance, session history information maintained by the collaborative tool may indicate that a control user has a long history of sharing varied sources of information with a particular user, thus indicating the suitability of further distribution of content to that user.

Based on evaluation of the activity related to the shared source of information by each participant and based on restrictions that may limit distribution of the information, at block 475 the collaborative tool may distribute any portion of the shared content to any number of the participants in the collaborative session. This may range from the collaborative tool determining that no participant is authorized to receive any of the shared content to determining that all participants are authorized to receive all of the shared content. In various scenarios, a subset of the participants may be omitted from the distribution of the shared content, such as based on identifying these participants as belonging to an outside organization or due to inability to adequately identify these participants as registered users that were scheduled to attend the collaborative session. Likewise, a subset of the shared information may be omitted from distribution, such as based on attribute classifications that limit distribution or such as the lack of a requisite participant interest level in the subset of the shared information. In this manner, embodiments support capabilities for identifying content shared during a collaborative session for distribution to the session participants, where the content is selected for sharing based on the context in which the content is shared.

In some embodiments, prior to actual distribution of shared content, the collaboration tool may include capabilities for identifying aspects of the virtual meeting session in which distributed information was shared. For instance, the collaboration tool may distributed shared information to a user along with metadata specifying various aspects of the collaborative session in which the information was displayed to the user, such as the meeting time and location, some or all of the meeting participants, the control user of the meeting, and a listing of other individuals receiving the distributed information. In some embodiments, the collaboration tool may include capabilities for watermarking the information that is distributed. For instance, a watermark may identify the virtual meeting in which the information was shared and may thus encode timestamps, location information and participant information.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for hosting a collaborative session between a plurality of users though operation of a collaboration tool, each participating in the collaborative session via an IHS (Information Handling System), the method comprising:
   detecting a first of the plurality of users joining the collaborative session via a user interface of the collaboration tool operating on a first IHS;
   detecting a second of the plurality of users joining the collaborative session via a user interface of the collaboration tool operating on a second IHS;
   displaying information that is shared by the second user via the collaborative tool to the user interface of the collaborative tool operating on the first IHS of the first user;
   monitoring activity by the first user while the information is displayed to the first user via the collaboration tool;
   detecting an event triggering distribution of the shared information;
   determining, based on the monitored activity of the first user during display of the information shared by the second user, whether to distribute a copy of the shared information to the first IHS of the first user for use of the shared information by the first user external to the collaboration tool, wherein the determination to distribute the copy of the shared information to the first IHS of the first user is based on whether the monitored activity of the first user during the display of the information shared by the second user surpasses a threshold level of activity by the first user; and
   transmitting a file to the first user, wherein the file comprises the copy of the shared information.

2. The method of claim 1, wherein the event triggering distribution of the copy of the information shared by the second user comprises the detection of the display of the shared information via the collaboration tool for longer than a first duration.

3. The method of claim 1, wherein the information shared by the second user is from a file and wherein the event triggering distribution of the shared information comprises the detection of a threshold portion of the contents of the first file being displayed to the first user via the user interface of collaboration tool operating on the first IHS.

4. The method of claim 1, wherein the monitoring of the activity by the first user while the shared information is displayed to the first user via the user interface of the collaboration tool operating on the first IHS comprises monitoring a location of the first user relative to the first IHS.

5. The method of claim 4, wherein the location of the first user relative to the first IHS is determined based on one or more user proximity sensors of the first IHS.

6. The method of claim 1, wherein the monitoring of the activity by the first user comprises detecting spoken participation by the first user during the display of the shared information to the first user via the user interface of the collaboration tool operating on the first IHS.

7. The method of claim 1, wherein the event triggering distribution of the information shared by the second user comprises detection of a key phrase spoken by in the second user during the collaborative session.

8. The method of claim 1, wherein the determination to distribute the shared information to the first IHS of the first user is further based on the first user being detected in proximity to the second IHS of the second user.

9. A first Information Handling System (IHS) configured for supporting participation in a collaborative session by a first user of the first IHS, comprising:
   a plurality of sensors;
   a sensor hub comprising a logic unit configured via firmware instructions to determine a user context based on inputs from the plurality of sensors;
   one or more processors;
   one or more memory devices coupled to the processors, the memory devices storing computer-readable instructions that, upon execution by the processors, cause a client application of a collaborative tool operating on the first IHS to:
   determine the first user has joined the collaborative session;
   display information shared by a second user participating in the collaborative session via the collaborative tool to the first user via the client application of the collaboration tool;
   monitor the user context of the first user while the information shared by the second user is displayed to the first user via the client application of the collaboration tool;
   detect an event triggering distribution of the displayed information; and
   receive a file comprising a copy of the information shared by the second user to the first IHS for use of the shared information by the first user external to the collaboration tool, wherein retrieval of the copy of the information shared by the second user to the first IHS of the first user is determined
   based on the monitored context of the first user during the display of the shared information to the first user via the client application, wherein the determination to retrieve the copy of the shared information to the first IHS of the first user is based on whether the monitored context of the first user during the
   display of the shared information surpasses a threshold level of activity by the first user.

10. The IHS of claim 9, wherein the plurality of sensors comprise one or more user proximity sensors and wherein the monitored user context of the first user comprises a location of the first user relative to the first IHS as determined using the user proximity sensors during display of the information shared by the second user.

11. The IHS of claim 9, wherein the plurality of sensors comprise an RFID (Radio Frequency Identification) sensor and wherein the monitored user context of the first user comprises a location of the first user relative to the first IHS as determined using the RFID sensor during display of the information shared by the second user.

12. The IHS of claim 9, wherein the plurality of sensors comprise one or more gaze detection sensors and wherein the monitored user context of the first user comprises determining whether a gaze of the first user is focused on the client application of the collaboration tool during display of the information shared by the second user.

13. The IHS of claim 9, wherein the plurality of sensors comprise one or more microphones and wherein the monitored user context of the first user comprises identifying spoken participation in the collaborative session during the display of the displayed information via the client application of the collaboration tool during display of the information shared by the second user.

14. The IHS of claim 13, wherein the event triggering distribution of the information shared by the second user comprises detection of a key phrase spoken by in the second user during the collaborative session.

15. A computer-readable storage device having instructions stored thereon for supporting participation in a collaborative session by a first user of a first IHS (Information Handling System), wherein execution of the instructions by one or more processors of the first IHS causes the one or more processors to:
   determine the first user has joined the collaborative session via a client application of a collaboration tool;
   display information shared by a second user participating in the collaborative session via the collaborative tool to the first user via the client application of the collaboration tool;
   monitor the user context of the first user while the information shared by the second user is displayed to the first user via the client application of the collaboration tool;
   detect an event triggering distribution of the information shared by the second user; and
   receive a file comprising a copy of the information shared by the second user to the first IHS for use of the shared information by the first user external to the collaboration tool, wherein retrieval of the copy of the information shared by the second user to the first IHS is determined based on the
   monitored context of the first user during the display of the information shared by the second user to the first user via the client application, wherein the determination to distribute the shared information to the first IHS of the first user based on whether the monitored context of the first user during the
   display of the shared information surpasses a threshold level of activity by the first user.

16. The computer-readable storage device of claim 15, wherein the event triggering distribution of the copy of the information shared by the second user comprises the detection of the display of the shared information via the collaboration tool for longer than a first duration.

17. The computer-readable storage device of claim 15, wherein the information shared by the second user is from a file and wherein the event triggering distribution of the shared information comprises the detection of a threshold portion of the contents of the file being displayed to the first user via the user interface of collaboration tool operating on the first IHS.

18. The computer-readable storage device of claim 15, wherein the monitoring of the context by the first user while the shared information is displayed to the first user via the user interface of the collaboration tool operating on the first IHS comprises monitoring a location of the first user relative to the first IHS.

* * * * *

UNITED STATES PATENT AND TRADEMARK OFFICE
CERTIFICATE OF CORRECTION

PATENT NO. : 11,489,892 B2
APPLICATION NO. : 17/088188
DATED : November 1, 2022
INVENTOR(S) : Leland et al.

It is certified that error appears in the above-identified patent and that said Letters Patent is hereby corrected as shown below:

In the Claims

In Column 21, Line 23, Claim 7, delete "spoken by in the second" and insert -- spoken by the second -- therefor.

In Column 21, Line 38, Claim 9, delete "computer- readable" and insert -- computer-readable -- therefor.

In Column 21, Lines 59 and 60, Claim 9, delete [HARD RETURN] at the end of Line 59 between the words "determined" and "based".

In Column 21, Lines 65 and 66, Claim 9, delete [HARD RETURN] at the end of Line 65 between the words "the" and "display".

In Column 22, Lines 54 and 55, Claim 15, delete [HARD RETURN] at the end of Line 54 between the words "the" and "monitored".

In Column 22, Lines 60 and 61, Claim 15, delete [HARD RETURN] at the end of Line 60 between the words "the" and "display".

Signed and Sealed this
Sixth Day of December, 2022

Katherine Kelly Vidal
*Director of the United States Patent and Trademark Office*